United States Patent
Subramanian et al.

(10) Patent No.: US 11,403,114 B2
(45) Date of Patent: Aug. 2, 2022

(54) SYSTEM AND METHOD FOR REMOTE CONFIGURATION OF ASPHALT PLANT

(71) Applicant: Caterpillar Inc., Peoria, IL (US)

(72) Inventors: Gautham Subramanian, Peoria, IL (US); Jacob J. McAlpine, Otsego, MN (US); John L. Marsolek, Watertown, MN (US)

(73) Assignee: Caterpillar Inc., Peoria, IL (US)

( * ) Notice: Subject to any disclaimer, the term of this patent is extended or adjusted under 35 U.S.C. 154(b) by 225 days.

(21) Appl. No.: 16/702,401

(22) Filed: Dec. 3, 2019

(65) Prior Publication Data

US 2021/0165665 A1    Jun. 3, 2021

(51) Int. Cl.
  *G06F 9/44*    (2018.01)
  *G06F 9/445*   (2018.01)
  *G05B 19/418*  (2006.01)
  *E01C 19/10*   (2006.01)

(52) U.S. Cl.
  CPC ..... *G06F 9/44505* (2013.01); *G05B 19/4184* (2013.01); *E01C 19/1009* (2013.01); *G05B 2219/32356* (2013.01)

(58) Field of Classification Search
  CPC ..... G06F 9/44; G06F 1/22; G06F 1/12; G06F 21/57
  See application file for complete search history.

(56) References Cited

U.S. PATENT DOCUMENTS

| | | | |
|---|---|---|---|
| 6,085,244 A * | 7/2000 | Wookey | G06F 11/2294 709/223 |
| 9,185,176 B2 | 11/2015 | Nielsen et al. | |
| 9,548,895 B2 | 1/2017 | Velupillai | |
| 9,659,268 B2 | 5/2017 | Nielsen et al. | |
| 2002/0188706 A1* | 12/2002 | Richards | H04L 41/0853 709/223 |
| 2005/0240832 A1* | 10/2005 | Owhadi | G06F 11/0748 714/46 |
| 2007/0050105 A1* | 3/2007 | Chinnadurai | G07C 5/008 701/31.4 |
| 2007/0253342 A1 | 11/2007 | Bierdeman | |
| 2008/0011839 A1 | 1/2008 | Noll et al. | |
| 2011/0313810 A1* | 12/2011 | Herzberger | G03G 15/5079 705/7.24 |
| 2012/0215378 A1 | 8/2012 | Sprock | |
| 2013/0198827 A1* | 8/2013 | Bhaskaran | H04L 63/10 726/7 |
| 2014/0122147 A1 | 5/2014 | Christie | |

(Continued)

FOREIGN PATENT DOCUMENTS

CN    110046720 A    7/2019

*Primary Examiner* — Keshab R Pandey
(74) *Attorney, Agent, or Firm* — Leydig, Voit & Mayer, Ltd.

(57) ABSTRACT

An onsite computer system can be located at a material production facility and used to generate tickets associated with the transfer of bulk materials such as asphalt or concrete. A remote computer system can communicate with the onsite computer system and can be used to generate ticket templates and configuration files that may be uploaded to the onsite computer system. In addition, the remote computer system can access the onsite computer system to edit system software or perform other corrective actions in the event there are any errors with the onsite computer system.

20 Claims, 6 Drawing Sheets

(56) References Cited

U.S. PATENT DOCUMENTS

| | | |
|---|---|---|
| 2014/0244330 A1 | 8/2014 | Hall |
| 2014/0244444 A1 | 8/2014 | Zhang |
| 2014/0372805 A1 | 12/2014 | Rijnders |
| 2015/0295759 A1* | 10/2015 | Mollersten ............ G06F 16/185 709/222 |
| 2016/0186531 A1* | 6/2016 | Harkless ................ E21B 44/00 702/6 |
| 2017/0061334 A1 | 3/2017 | Chen |
| 2018/0183740 A1* | 6/2018 | Werdell .................. H04W 4/14 |
| 2018/0338251 A1* | 11/2018 | Rouland ............. H04L 41/0803 |
| 2019/0204139 A9 | 7/2019 | Pommerening et al. |

* cited by examiner

COMPANY LOGO
COMPANY ADDRESS

Ticket No.: _____   Order No.: _____   Date: _____

Plant ID: _____   Destination: _____   Truck No.: _____

Customer: _____   Project: _____   Driver: _____

Material: _____   Quantity: _____   Garde: _____

Unit Price: _____   Total Price: _____   Invoice No.: _____

Pick Up Time: _____                          Delivery Time: _____

Remarks:

Plant Inspector Signature:

Customer Signature:

FIG. 3

SYSTEM AND METHOD FOR REMOTE CONFIGURATION OF ASPHALT PLANT

TECHNICAL FIELD

This patent disclosure relates generally to the remote configuration of an onsite computer system at a bulk material handling facility and, more particularly, to a system and method configuring an onsite computer system from a remote computer system.

BACKGROUND

Different types of bulk materials are used in construction, industry, and similar fields for a variety of purposes. For example, asphalt is typically used in road construction and paving to provide a finished surface. Similarly, concrete is often used in the construction of buildings and other structures. Other examples include aggregates used as filler materials and in the production of other materials. Bulk materials are typically stored and may be processed at one location and must be transported to the location of their intended use, a field known as bulk material handling. To transport the bulk materials overland, road trucks hauling dump trailers or opened hopper trailers are typically utilized. The trailers can be filled with the bulk materials and the road trucks haul the materials to their location of use. At times, a fleet of trucks may make several trips a day between a material production plant or storage location and the construction worksite or other destination. To document the material hauling process from the production facility, tickets have been traditionally generated which may be paper receipts printed and provided to the operator of the road truck to indicate acceptance of the loaded materials. Information in the ticket may include the material supplier, the customer, the bulk material type, quantity, and price, and the dates of material pickup. The tickets may be further kept in the records of both the material provider and the material customer to document the exchange of the bulk material.

Prior art systems of local configuration management can have several disadvantages as shown in FIG. 6 which represents a prior art environment 500 where onsite configuration management system is in place. As can be seen in FIG. 5, various costs can be associated with each software deployment 502 wherein service personnel may be required to travel to a facility where an onsite computer system is situated. The onsite computer system can possibly be located continents away from the remote computer system. For instance, a remote computer system can be located in the USA and the onsite computer system can be located in Asia. In this case, travel personnel are required to travel to the onsite facility for each deployment and bugfix and incur cost of travelling from the USA to Asia indicated by reference numeral 504. Similarly, the travel personnel will incur living expenses 506 and other incidental expenses for the duration of stay. Because the onsite configuration management of prior art mandates the physical presence of a service personnel onsite, the service personnel are required to travel to the site where system to be configured is located. The travel can cause the service personnel to be unproductive during working hours 512 while in transit.

Further, the scale house where the service personnel is required to work onsite may be hosted in a small confined area. Thus, the service personnel can be confined in the scale house for hours while performing onsite configuration management tasks. This can cause stress and fatigue as indicated by reference numeral 508. Notably, the onsite system may be shut down while the onsite configuration management task is being performed. This can lead to loss of services provided by the onsite system. The loss of services can result in loss of revenue 510. Thus, each new deployment may result in generating a ripple effect wherein each expense contributes to financial burden with onsite configuration systems of the prior art.

More recently, efforts have been made to automate the ticketing process using computers. For example, U.S. Patent Publication No. 2014/0244444 ("the '444 publication") describes a paperless ticketing system to document the loading and hauling of concrete from a concrete batch plant. The '444 publication in particular describes a plurality of computers that interact over a distributed network to generate electronic tickets that can be made available to concrete production operators, the construction company personnel, and other stakeholders in the bulk material handling process. In an embodiment, the electronic tickets may be maintained on a server at a back office location for ease of availability. Generation of individual tickets, however, still occurs at the material production plant or storage facility when the road truck is loaded and dispatched with the bulk material. Accordingly, at least a portion of the computer system should be located at the material production facility, which may require a technician to travel to the facility to implement and debug the system, resulting in costs and downtime. For example, the costs may involve travel time and lost wages of the technician due to travel. In addition, the technician may need to communicate with other individuals to correct any issues with the system, which may be hindered due to the remote location of the facility. The present disclosure in contrast is directed to system and method for ticket generation and management utilizing a distributed computer architecture in a more efficient manner.

SUMMARY

The disclosure describes, in one aspect, a ticket processing system for generating tickets to document the distribution of bulk materials from a material production facility. The system includes an onsite computer system including an onsite processor and non-transitory onsite memory. The onsite computer system may be configured to store raw ticket data in the onsite memory and to generate a ticket from a ticket template stored in the onsite non-transitory memory. The ticket processing system also includes a remote computer system with a remote processor and non-transitory remote memory. The remote computer system can be configured to selectively communicate with the onsite computer system to capture and download the raw ticket data from onsite memory and to generate and upload a ticket template for generation of the tickets.

In another aspect, the disclosure describes a method for enabling the generation of tickets associated with a material transfer at a material production facility. The method captures and downloads raw ticket data from an onsite computer system operatively associated with the material production facility to a remote computer system. The method then generates a ticket template at the remote computer system a ticket template for generation of tickets. The ticket template is then uploaded to the onsite computer system from the remote computer system. A configuration file may be generated at the remote computer system for configuring operational settings on the onsite computer system. The configuration file is then uploaded to the onsite computer system and the onsite computer system can be remotely rebooted to load and read the configuration file.

In yet another aspect, the disclosure describes a ticket processing system that includes an onsite computer system and a remote computer system. The onsite computer system is configured to store raw ticket data in the onsite memory and to generate a ticket from a ticket template. The remote computer system is configured to selectively communicate with the onsite computer system to capture and download the raw ticket data from onsite memory and to generate and upload a ticket template for generation of the ticket. The remote computer system is further configured to access and edit system software on the onsite computer system in the event an error signal is transmitted from the onsite computer system to the remote computer system.

BRIEF DESCRIPTION OF THE DRAWINGS

FIG. 3 is an example of a ticket including data fields and formatting for the generation of a ticket to document material transfer events at the material production facility.

DETAILED DESCRIPTION

Figure 1:
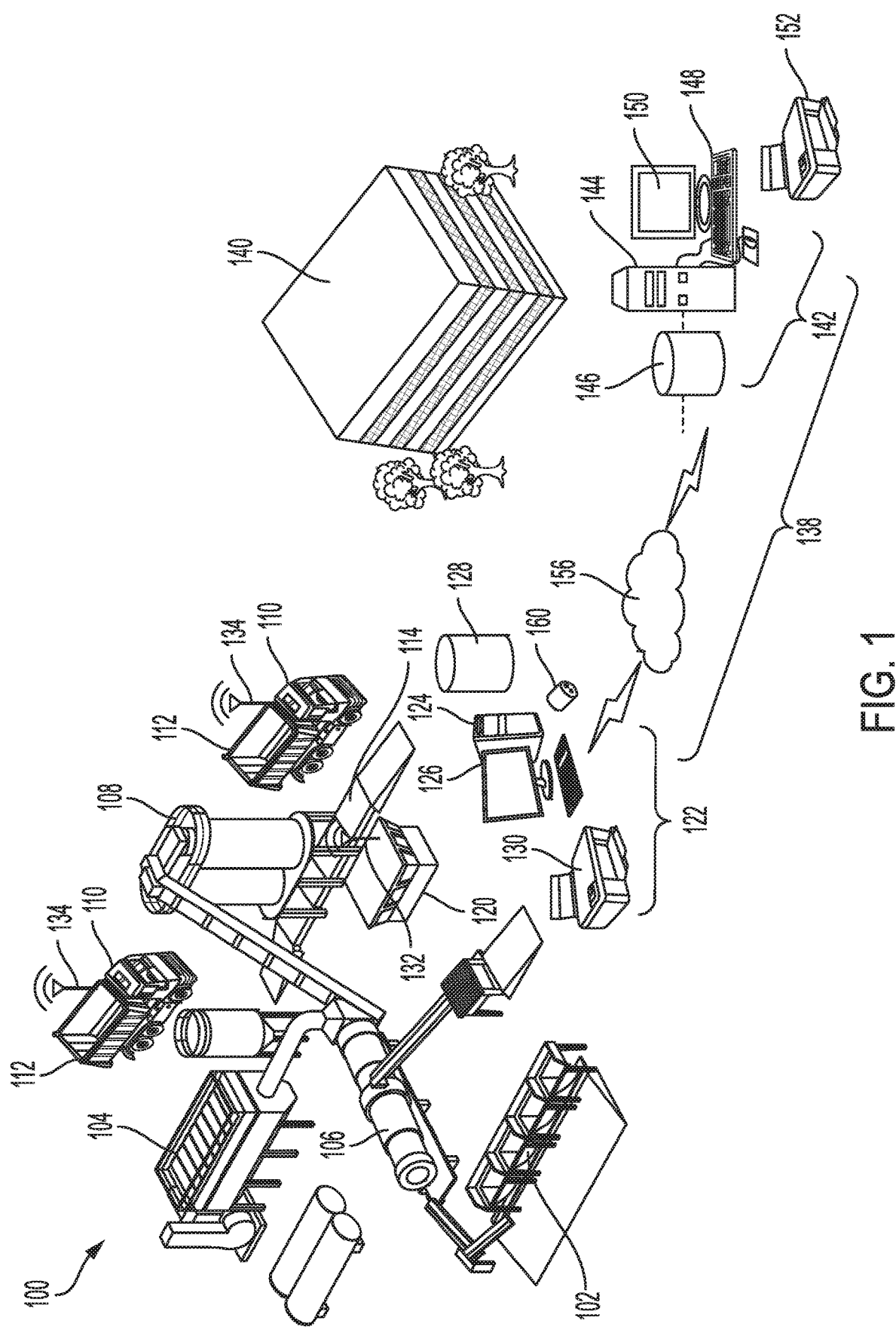
FIG. 1 is a schematic illustration of a material production facility for the processing and distribution of bulk materials by road trucks that may be associated with a distributed computer system for the developing and generating of tickets in accordance with the disclosure.

Now referring to the drawings, wherein whenever possible like reference numbers will refer to like elements, there is illustrated a material production facility 100 for the production of a bulk material such as, for example, an asphalt plant for the production of asphalt. Asphalt and other bulk materials are typically granular or fractured materials that are handled without packaging. Other examples include concrete, aggregates, and similar materials. In the illustrated embodiment of an asphalt plant, the material production facility 100 can include equipment for the preparation and processing of the bulk material from raw materials. In the example of asphalt, production begins with an aggregate such as fractured rock or stone, which may be kept in an aggregate supply 102 and separated by size or grades. To provide the consistency and viscosity associated with asphalt, a bitumen supply 104 may store bitumen or another binder. Other additives may be kept and supplied from similar storage supplies. The material processing facility 100 can also include a burner and drum assembly 106 in which the raw materials are mixed and processed to provide the final bulk material. The processed asphalt or other bulk material can be kept in storage hoppers 108 or the like until ready for loading to a road truck 110 or similar transportation vehicle. In the illustrated embodiment, the storage hoppers 108 can be vertical, raised silos supported above the ground and through the bottom of which the bulk material can be dispensed, although in other embodiments, the storage hoppers 108 can have other suitable configurations.

In the example of an asphalt plant, the bulk material may be removed by a plurality of road trucks 110 configured to haul the material and travel between the material production facility 100 and the site of intended use for the bulk material such as, for example, a road construction process. In fact, a fleet of road trucks 110 may be utilized and may make several trips per day to continue the project. The road trucks 110 may include a dump body 112 or a similar structure that can hold the material and that has an opened top configuration to receive the bulk material from the storage hoppers 108. The dump body 112 may be an open topped structure to receive the material and may be tilted with respect to the rest of the road truck 110 to dump the material at the desired location. The road trucks 110 can be adapted to travel on highways or paved roads. To load the road truck 110, it can be driven under the storage hopper 108 and the bulk material can be dispensed into the dump body 112. To determine how much material is actually included per load, a scale 114 for measuring weight may be disposed under the storage hoppers 108 and can support and weigh the road trucks 110 thereon. Accordingly, the scale 114 can measure both an empty or tare weight of the road truck 100 and a loaded weight, from which the weight the bulk material in the road truck can be readily determined.

Figure 2:
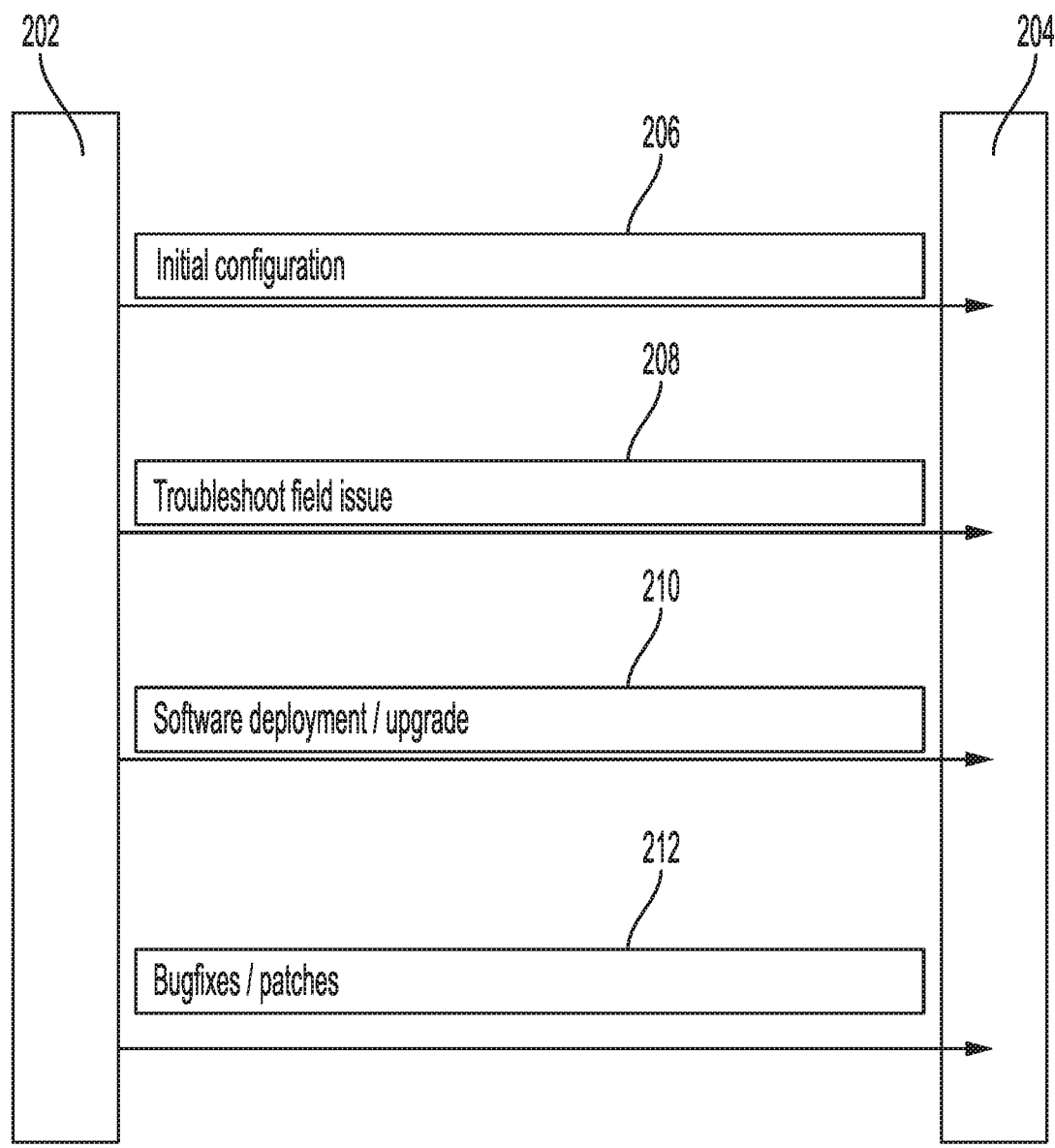
FIG. 2 is a schematic illustration of a distributed computer system in an onsite computer system and a remote computer system may interact to configure various parameters, ports, and settings of the onsite computer system.

To generate tickets to document the loading and hauling process, the material production facility 100 can include a ticket house 120, which may be a physical onsite structure to accommodate facility operators and equipment associated with the process. A ticket may be generated for each load dispensed to a road truck 110 to document receipt of the bulk material by a customer. In addition, each load may be a portion of a larger order placed by the customer and supplied by the material production facility 100. Accordingly, in the example of a road construction project, several tickets may be issued to multiple road trucks 110 over multiple days for fulfilling the customer order for the same project. For example, referring to FIG. 2, there is illustrated distinct instances and examples of actions taken between a remote computer system 202 and an onsite computer system 204 to identify, diagnose, analyze and resolve various issues encountered at an onsite computer system. In FIG. 2, there is illustrated a network in which the remote computer system 202 is configured to provide a hardware and software blueprint of an onsite computer system 204 that may be physically located in separate locations and may be significant distances apart. The remote computer system 202 may initially establish a communication link with the onsite computer system 204 to download initial network configuration information 206.

A typical network configuration involves a process of setting a network's controls, data flows and operation to support the network communication between the remote computer system 202 and the onsite computer system 204. This includes initiating setup processes on network hardware, software and other devices and components associated with the onsite computer system 204. For example, the initial configuration may involve port configuration of the onsite computer system 204. In one embodiment of the disclosed invention, the onsite computer system 204 may have several input and output ports. The task of configuration management may entail defining which port is to be connected to which input. For example, the configuration management application interface can be connected to configuration management web service point, the printer proxi is connected to printer point, in-field operation client is connected to internet point, the software update service is connected to the remote computer system server point, onsite computer system server is connected to onsite computer system database server point, the reporting service is connected to alarm management system server point and the like. This port configuration defines a set of software tasks that are to be performed by the designated portions of hardware.

In the event of errors or bugs occurring with the onsite computer system 204 once it has been configured, for example, if a communication port failure or the like occurs, the network of FIG. 2 may perform a field trouble shooting action 208 in which the remote computer system 202 can access the onsite computer system 204. In addition, the network may be capable of a software deployment action in which the remote computer system 202 can deploy software upgrades to the onsite computer system 202. Similarly, the remote computer system 202 may be configured to conduct a debugging/patch action 212 to install a bugfix or software patch to the software previously installed on the onsite computer system 204. In the prior art environment described above, each of these actions would individually require service personnel to physically travel from the remote computer system 202 to the onsite computer system 204 on possibly multiple occasions. Over the span of life of software and hardware system, this travel can incur significant costs.

In a further embodiment of the disclosed invention, the remote configuration management allows the remote computer system to configure and maintain the onsite computer system such as the remote computer system can take automated backups of configuration files, encrypt and store configuration files, track configuration changes in real-time, and the like. For example, the remote computer system can bring a port down if an alarm is communicated to the remote computer system 202 from the indicating the respective port is defective. Moreover, the remote computer system 202 can record history of configuration changes so that the remote computer system can take measures to instantaneously recover the onsite computer system from possible network disasters.

In addition to managing the load on each port of the onsite computer system, the remote computer system 202 may be configured to ensure that device configuration of the onsite computer system 204 complies with the industry standards and with updates to such standards. Further, the remote configuration system 202 can monitor the onsite computer system continuously and in real time to detect unauthorized changes made to the onsite computer system to provide enhanced network security and prevent unauthorized configuration changes. The unauthorized configuration changes can be intentional and conducted for malicious reasons. In such cases, the remote computer system can take appropriate measures to safeguard the onsite computer system. Conversely, if the configuration changes are unintentional and unsatisfactory, then the remote computer system can take remedial action to restore settings and parameters. Advantageously, the remote computer system can generate insightful reports on configuration changes, compliance, the status of raw material inventory and other vital network parameters.

Referring to FIG. 3, an example of a ticket is illustrated an example of a ticket that may include some of the data field and information associated with the ticketing process. A ticket can be an physical paper copy or an electronic token encapsulating relevant information for the ticket Examples of relevant information include ticket number, order number, material production facility, customer identification, project identification, truck identification, material type, material grade, load quantity (obtained from the scale 114), date, time, price, etc. In addition, the tickets may include the signature of one or more individuals to acknowledge the transaction.

Referring back to FIG. 2, to prepare the tickets, the ticket house 120 may be associated with an onsite computer system 122 that includes the physical hardware and software components. In an example, the onsite computer system 122 can include an onsite central processing unit 124 that has the microprocessor and related circuitry for conducting logic operations and executing software instructions related to the hauling and ticketing process. The central processing unit 124 can be enclosed in a cabinet or case for support. To interface with operators and enable the exchange of information and data, the onsite computer system 122 can include input-output peripherals 126 (e.g., monitors, keyboards, mice). To store data and information related to the hauling and ticketing process in computer readable form, and to store the software application for conducting the process, the onsite computer system 122 can include an onsite data storage 128 that may be a non-transitory computer readable and writeable memory such as read only memory ("ROM"), random access memory ("RAM"), EPROM memory, flash memory, or another suitable storage medium like magnetic or optical storage. The onsite computer system 122 can also include or be operatively associated with other devices and peripherals to facilitate the generation of tickets such as handheld personal digital assistants (PDAs), touchscreen tablets, barcode scanners, electronic readers, etc.

In an embodiment, the tickets may be generated and exchanged in the traditional manner of paper copies that can be physically exchanged with the road trucks 110. To print tickets, the onsite computer system 122 may include a printer 130 located in the ticket house 120. Information for the ticket may be entered as data through the onsite computer system 122 and printed and memorialized on the paper ticket using the printer 130. In addition, the ticket information can be stored in electronic form in the onsite data storage 128 that can function as a repository of raw data included in the tickets generated over time. In another embodiment, the onsite computer system 122 can be configured to generate and exchange electronic or paperless tickets in which all information is maintained in electronic, digitally readable form. In such an embodiment, the ticket house 120 may be operatively associated with a wireless transmitter/receiver 132 such as a shortwave antenna that can exchange radio wave communications. The road trucks 110 may include similar wireless transmitter/receivers 134 to electronically and wirelessly communicate with the onsite computer system 122 by exchange message signals with the wireless transmitter/receiver 132 of the ticket house 120. In such an embodiment, the road trucks 110 can include an appropriate display or interface to enable the truck operator to visually perceive and verify the ticket information. The wireless communication between the road truck 110 and the onsite computer system 122 can utilize any suitable technology standards or protocols such as Wi-Fi and Bluetooth.

The onsite computer system 122 may be part of a larger, distributed computer environment or architecture 138 for the generation and processing of tickets associated with the handling and transportation of bulk materials. For example, the material processing facility 100 may interact with a remote facility 140 that can be a back office location, a headquarters, or another location that may be physically remote from the material processing facility by a significant distance. The remote facility 140 may be maintained by the owners/operators of the material production facility, or may be associated with an application service provider ("ASP"), through independent contractors or the like. The remote location 140 can include a physical building or structure to accommodate remote workers or technicians who may also contribute to ticket generation and processing. To assist the remote workers, the remote facility 140 can be operatively associated with a remote computer system 142 that also includes the physical hardware and software components for implementing the ticket generation system. To digitally process data and instructions and run software applications, the remote computer system 140 can include a remote central processing unit 144 that has one or more microprocessors and related circuitry components that may be enclosed in a case or cabinet. The remote computer system 142 can also include or be associated with a remote data storage 146 that may be non-transitory, readable-writeable memory and may be implemented electronically, magnetically, optically, etc. The remote data storage 146 may be capable of storing significant volumes of data in computer readable bits and bytes and may be capable of organizing the data to simplify searching in the manner of a database. To interface with the remote workers and to enable the entry and manipulation of computer readable data, the remote computer system 142 can include input-output peripherals 148 (e.g., monitors, keyboards, mice). The input-output peripherals 148 in particular may include a monitor or visual display to support and display a user interface 150. The user interface 150 may be a graphical user interface or may support text-based navigation and manipulation of data. For printing physical documents and records, the remote computer system 142 may also include a printer 152. While FIG. 1 illustrates the components of the remote computer system 142 in a centralized manner at a single physical remote facility 140, the components and locations may be distributed over a plurality of computers and platforms networked together at different physical locations.

To enable the onsite computer system 122 and the remote computer system 142 to electronically communicate by sending and receiving messages, the distributed network system 138 may be operatively associated with a computer network 156. The computer network 156 can be implemented in any suitable form including the internet or as a private network, and the communications may be public, private, or otherwise. The computer network 156 may operate as a packet-switching network by communicating data packets. The computer network 156 can utilize any suitable communications protocol such as, for example, TCP/IP. All or part of the communications may occur via conductive or optical conduits or may occur wirelessly such as through, for example, satellite networks. The computer network 156 may include other elements such as routers, gateways, hubs and the like to facilitate communications. In addition to the onsite and remote computer systems 122, 142, the computer network 156 can communicatively connect other nodes or hubs. For example, in an embodiment, the remote computer system 142 can be operatively associated with a plurality of onsite computer systems 122 at different material manufacturing facilities 100 distributed over any conceivable geographic area.

In an embodiment, the computer network 156 and the distributed computer architecture 138 on which it operates may be configured as a peer-to-peer model with the onsite computer system 122 and the remote computer system 142 interfacing equally. In another embodiment, the computer network 156 and the underlying architecture 138 may be configured as a client-server model with the onsite computer system 122 acting as a client and the remote computer system 142 functioning as a server. In a further embodiment, the network and architecture may be configured for remote administration of the onsite computer system 122 from the remote computer system 142. In particular, remote computer system 142 may be able to direct and control resources and modify configurations on the onsite computer system 122, as well as process, analyze, and edit hardware components, software components and data on the onsite computer system 122.

Figure 4:
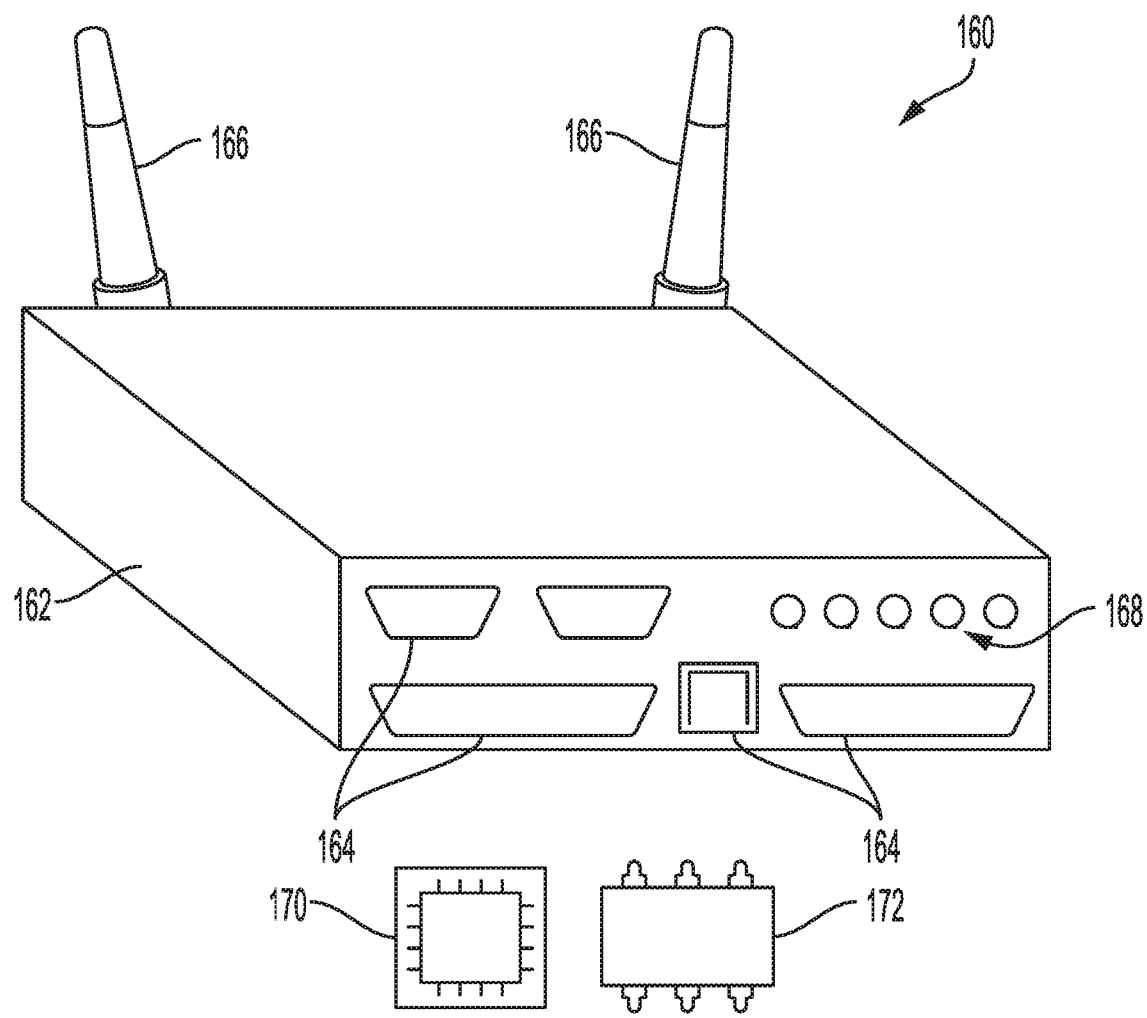
FIG. 4 is an illustration of a ticket interface module that may be a dedicated embedded system or controller located at the material production facility for the generation of tickets.

In a possible variation of the remote administration embodiment, the onsite computer system 122 can include or comprise a dedicated embedded system or controller 160 and may be configured to perform specific, dedicated tasks to implement the ticket generation and processing system. Referring to FIG. 4, there is illustrated an embodiment of the dedicated embedded controller 160, which may be referred to as a ticket interface module, that can be physically installed at the material processing facility 100, for example at ticket house 120, and that can be operatively associated with the onsite computer system 122. The dedicated embedded controller 160 can be standalone device configured for rack-mounted installation in a larger cabinet or the like. The dedicated embedded controller 160 may be enclosed in a multisided box-like case 162. To communicate with other devices, including with computer network 156 associated with the onsite and remote computer systems 122, 142, the dedicated embedded controller 160 can include a plurality of ports 164 accessible through the case 162. Examples of ports include serial ports, parallel ports, USB ports or similar data ports in which data communication occurs by transfer of electrical signal though conductive pins in physical contact with each other. Other ports may include modular connectors such as Ethernet connectors or RJ type jacks. In an embodiment, to communicate wirelessly, the dedicated embedded controller 160 can include wireless transmitter/receivers 166 to exchange radio wave communications. In addition, to provide visual signals regarding operational status, the dedicated embedded controller 160 may include a plurality of light emitting diodes 168 or similar visual displays coded to communicate status information.

The dedicated embedded controller 160 may include appropriate circuitry and hardware to implement programmable functionality associated with the generation and processing of tickets related to the bulk material transfers. For example, an embedded processor 170 can be included for processing computer executable instructions, programs, applications, and data in the form of software encoded as binary bits and bytes. Examples of suitable embedded processors 170 include programmable logic devices such as field programmable gate arrays ("FPGA"), dedicated or customized logic devices such as application specific integrated circuits ("ASIC"), gate arrays, a complex programmable logic device, or any other suitable type of circuitry or microchip. In addition, to store the software and data processed by the embedded processor 170, the dedicated embedded controller 160 can include non-transitory computer readable and writeable embedded data storage 172 such as read only memory ("ROM"), random access memory ("RAM"), EPROM memory, flash memory, or another suitable storage medium like magnetic or optical storage.

INDUSTRIAL APPLICABILITY

Figure 5:
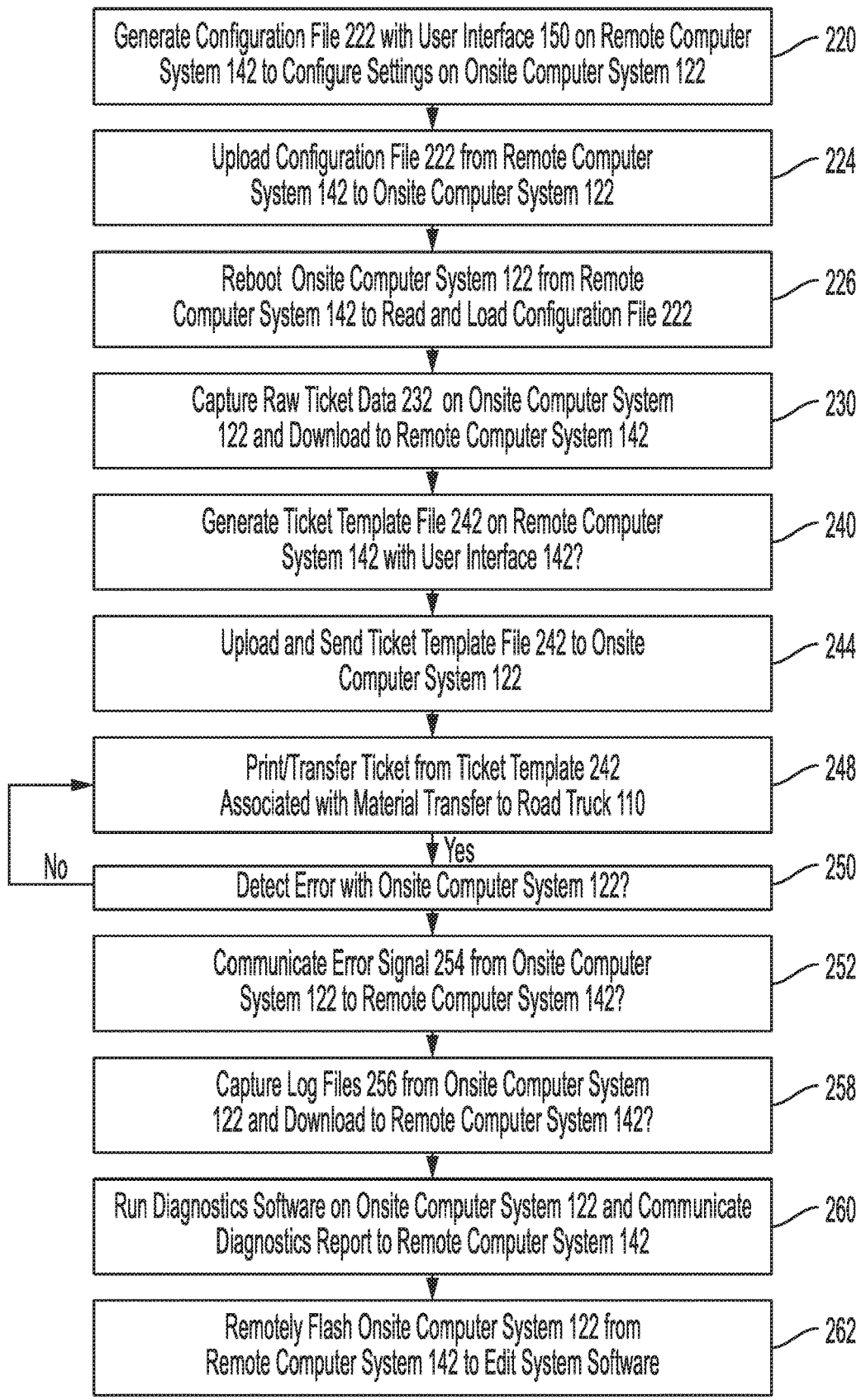
FIG. 5 is a flow diagram of a possible process or routine, for implementing a ticket processing system between an onsite computer system at the material production facility and a remote computer system.
Figure 6:
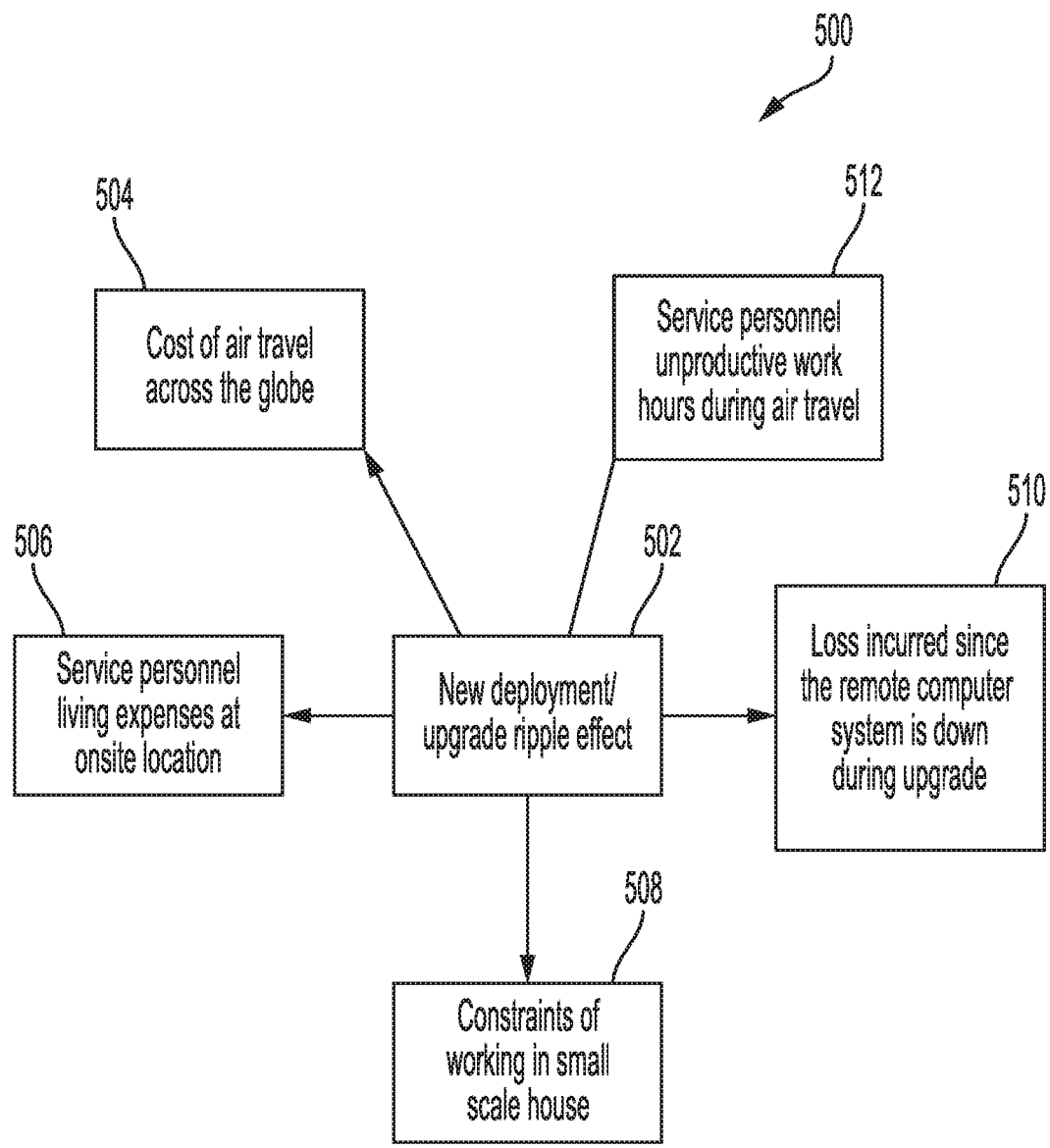
FIG. 6 is a representative illustration of a prior art environment in which service personnel may travel to a location to configure an onsite computer system.

Referring to FIG. 5, there is illustrated a flow diagram of an exemplary computer implement method to generate, manage and process tickets associated with the transportation of bulk materials from a material processing facility 100 such as illustrated in FIG. 1. In particular, the illustrated method may be implemented in a distributed computing application or architectural environment including an onsite computer system 122 located at the material processing facility 100 and a remote computer system 142 located elsewhere. Moreover, the method may facilitate remote administration of the onsite computer system 122 by the remote computer 142. The method depicted in the flow diagram for accomplishing these tasks may include a series of steps or instructions implemented as non-transitory computer executable software code in the form of an application or program.

To configure the onsite computer system 122, to generate and process tickets using ticket templates, the remote computer system 142 can also conduct a config generation step 220 in which one or more configuration files 222 are generated. The configuration file 222 can be a computer readable file and can include the settings, parameters, and specifications for generating tickets on the onsite computer system 122. For example, in the embodiments where the onsite computer system 122 includes a dedicated embedded controller 160, the configuration file 222 can define what ports 164 are intended to transfer and receive specific data or information, what data rates and protocols to use, and the like. The config generation step 220 can be done at least in part manually by an operator or technician with knowledge of the system configuration needed to implement the ticket templates on the onsite computer system 122. After the remote computer system 142 has generated the configuration file 222, the remote computer system can conduct an config upload step 224 in which the configuration file is uploaded and sent to the onsite computer system 122. The computer network 156 can be used to transfer the system configuration file 222. To load the configuration file 222 to take effect and replace any prior configuration files or settings, the remote computer system 142 can conduct a reboot step 226 to remotely reboot the onsite computer system 122. In another embodiment, the configuration files 202 can be configured for dynamic configuration in which the settings may take effect without remote rebooting.

In an embodiment, the method 200 may include a data capture step 230 where the remote computer system 142 accesses the onsite computer system 122 to capture and download raw ticket data 232. Raw ticket data 232 may be a computer readable file that includes the data and information after performing a set of operations to convert the raw data into human readable data, the human readable data is captured in the tickets being generated. For example, the raw ticket file 232 can include or indicate the data fields and types of data or information that may be included with the tickets when generated, may include other information about the format or formation of the tickets, and may include information about how the ticket is generated by the onsite computer system 122. The data in the raw ticket data 232 can be captured when the onsite computer system 122 sends tickets to the printer 130 for printing and may be unprocessed, unformatted data, for examples, an unprocessed string of text or information from the generated ticket. The data capture step 230 may be initiated from the remote computer system 142 and the raw data files may be downloaded and stored in the remote data storage 146 for further analysis.

In a template generation step 240, one or more ticket templates 242 may be generated on the remote computer system 142 from, in part, the raw data file 232. The ticket template 240 may be, for example, a predesigned document that contains the formatting and generic text that can be used to generate tickets documenting individual material transfer events such as loading of a road truck 110. The ticket templates 242, which can be computer readable files and can be similar to the example shown in FIG. 3, can define the data fields to be included in the ticket and can describe the presentation and organization of those fields in the ticket. In an embodiment, the ticket templates may be implemented as a markup file written in a markup language such as HTML. The ticket templates 242 allow for the development of customized ticket formats for particular material process facilities 100. The ticket templates 242 may set forth data field lengths, data file population rules, and the like. To develop and generate the ticket templates 242, the remote computer system 142 can analyze and parse the information captured in the raw ticket files 232 from the onsite computer system 122 to determine what ticket data and information is typically obtained for that material processing facility 100. In an embodiment, the template generation step 240 may be done at least in part manually by a remote technician or operator analyzing the raw data file 232. The remote computer system 142 can include functionality or software tools to assist in the development of the ticket templates 242. For example, the remote computer system 142 can include a plurality of sample templates stored in the remote data storage 146. The user interface 150 on the remote computer system 142 can be formatted to assist in the development of the ticket templates with menus, commands and the like. Once the ticket templates 242 have been generated, the remote computer system 142 can conduct a template upload step 244 in which the templates are uploaded and transferred to the onsite computer system 142, which can store the templates in the onsite data storage 124.

Once the ticket templates 242 and configuration file 222 have been transferred, stored and implemented on the onsite computer system 122, the onsite computer system 122 in a print/transfer ticket step 246 can generate tickets to document the material transfer events such as the loading and hauling away of material by the road trucks 110. The tickets may be physically printed utilizing the printer 130 or, in an embodiment, may be electronic tickets wirelessly transferred between the ticket house 120 and the road trucks 110 using the transmitter/receivers 132, 134. In addition, the data and information included in the individual tickets can be stored electronically in the onsite data storage 134 and can be periodically communicated back to the remote computer system 142 or to another node using the computer network 156 for further processing, analysis, invoicing etc.

The method can further conduct an error detection step 250 to detect errors or bugs that may affect the operation of the onsite computer system 122 in generating tickets. For example, the error detection 250 may be continuously or periodically run on the onsite computer system 122 and, if an error or bug is detected, in an error communication step 252 an error signal 254 may be sent to the remote computer system 142. If no error is detected, the method can return to the print/transfer ticket step 248 to continue generating tickets. In an embodiment, the error detection step 230 may be conducted by error detection software stored in the onsite data storage 126 and run from the onsite computer system 122. In another embodiment, the error detection step 250 can be run from the remote computer system 142 by periodically logging into and running diagnostics analysis on the online computer system 122. For example, the onsite computer system 122 may create and store log files 256 recording events, including errors, in the onsite data storage 126. In a log capture step 258, the remote computer system 142 may capture and download the log files 256 that can be analyzed to assess the technical performance of the onsite computer system 122 and expose errors and bugs. In another example, in a diagnostics step 260, the remote computer system 142 can run diagnostics software on the onsite computer system 122 to develop and communicate a diagnostics report detailing errors or bugs with the onsite computer system. In the event the error detection step 250, the log capture step 258, or the diagnostics step 260 detects an error, the remote computer system 142 can access the onsite computer system 122 and a technician working remotely can edit the system software to correct the error. Editing of the system software on the onsite computer system 122 from the remote computer system 142 may be referred to as flashing and may be accomplished in a flash step 262. For example, this type of remote corrective action conducted during the flash step 262 may involve regenerating a configuration file 202, uploading and sending the configuration file from the remote computer system 142 to the onsite computer system 122, and rebooting the onsite computer system 122 to implement the correction.

A possible advantage of the foregoing disclosure is that it eliminates the need for technicians to travel to the material production facility 100 to configure and debug the onsite computer system 122. A possible related advantage is that travel costs, stayover costs, lost wages, and the stress of working remotely can be reduced or eliminated. Another possible advantage is that additional resources and technicians may be available for consulting at the remote facility which would not be others accessible if configuration and debugging had to occur at the material production facility. These and other possible advantages and features of the disclosure will be apparent from the above detailed description and figures.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A ticket processing system for configuring an onsite computer system from a remote computer system comprising:
   an onsite computer system including an onsite processor and non-transitory onsite memory, the onsite computer system configured to receive and store a configuration file for configuring the onsite computer and to store raw ticket data in the onsite memory; and
   a remote computer system including a remote processor and non-transitory remote memory, the remote computer system configured generate and upload the configuration file to the onsite computer system and to communicate with the onsite computer system to capture and download the raw ticket data from onsite memory.

2. The ticket processing system of claim 1, the remote computer system is further configured to generate and upload a ticket template from the raw ticket data to the onsite computer system; and the onsite computer system is configured to generate a ticket from the ticket template.

3. The ticket processing system of claim 2, wherein the remote computer system is configured to remotely reboot the onsite computer system after uploading the configuration file to the onsite computer system to replace an existing configuration file on the onsite computer system.

4. The ticket processing system of claim 3, wherein at least one of the onsite computer system and the remote computer system are configured to perform diagnostic analysis of the onsite computer system.

5. The ticket processing system of claim 4, wherein the onsite computer system is configured to store a log file in the onsite non-transitory memory, and the remote computer system is configured to capture and download the log file.

6. The ticket processing system of claim 5, wherein the onsite computer system is a client and the remote computer system is a server.

7. The ticket processing system of claim 1, wherein the onsite computer system is a dedicated embedded system.

8. The ticket processing system of claim 1, wherein the onsite computer system includes a printer for printing the ticket.

9. The ticket processing system of claim 1, wherein the raw ticket data captures ticket information printed on the ticket.

10. The ticket processing system of claim 1, wherein the ticket template is a markup file written in a markup language.

11. The ticket processing system of claim 1, wherein the ticket is a paperless ticket and the onsite computer system includes a transmitter/receiver to transmit the paperless ticket to a road truck.

12. The ticket processing system of claim 1, wherein the remote computer system includes a user interface adapted to allow a user to manually generate the ticket template and to manually generate the configuration file.

13. A method for enabling the generation of a ticket associated with a material transfer at a material production facility comprising:

generating at a remote computer system a configuration file for configuring operational settings on an onsite computer system operatively associated with the material production facility and uploading the configuration file to the onsite computer system;

rebooting the onsite computer system from the remote computer system to load and read the configuration file;

capturing and downloading raw ticket data from the onsite computer system to a remote computer system; and generating at the remote computer system a ticket template from the raw ticket data for generation of a ticket and uploading the ticket template to the onsite computer system.

14. The method of claim 13, further comprising diagnostically analyzing the onsite computer system and downloading a diagnostic analysis to the remote computer system.

15. The method of claim 14, further comprising conducting error detection on the onsite computer and communicating an error signal to the remote computer system in the event an error is detected.

16. The method of claim 15, further comprising remotely accessing the onsite computer system from the remote computer system to edit the system software.

17. The method of claim 16, wherein the onsite computer system is a client and the remote computer system is a server.

18. The method of claim 17, wherein the onsite computer system is a dedicated embedded system.

19. The method of claim 18, wherein the remote computer system includes a user interface adapted to allow a user to manually generate the ticket template and to manually generate the configuration file.

20. A ticket processing system comprising:

an onsite computer system operationally configured by a configuration file to store raw ticket data in the onsite memory and to generate a ticket from a ticket template stored in wherein the ticket is associated with a material transfer; and a remote computer system configured to generate and upload the configuration file to the onsite computer system, to communicate with the onsite computer system to capture and download the raw ticket data from onsite memory, and to generate and upload a ticket template for generation of the ticket, the remote computer system being further configured to access and edit system software on the onsite computer system in the event an error signal is transmitted from the onsite computer system to the remote computer system.

* * * * *